US010328615B2

(12) United States Patent
Ito et al.

(10) Patent No.: US 10,328,615 B2
(45) Date of Patent: Jun. 25, 2019

(54) MOLDING EQUIPMENT OF COMPOSITE MATERIAL AND MOLDING METHOD OF COMPOSITE MATERIAL

(71) Applicants: Fuji Jukogyo Kabushiki Kaisha, Tokyo (JP); Kabushiki Kaisha Ashida Seisakusho, Ikoma-shi (JP)

(72) Inventors: Yumi Ito, Tokyo (JP); Masanori Nakajima, Tokyo (JP); Takeshi Ashida, Kadoma (JP)

(73) Assignees: SUBARU CORPORATION, Tokyo (JP); KABUSHIKI KAISHA ASHIDA SEISAKUSHO, Ikoma-Shi, Nara (JP)

( * ) Notice: Subject to any disclaimer, the term of this patent is extended or adjusted under 35 U.S.C. 154(b) by 264 days.

(21) Appl. No.: 15/054,048

(22) Filed: Feb. 25, 2016

(65) Prior Publication Data

US 2016/0263784 A1 Sep. 15, 2016

(30) Foreign Application Priority Data

Mar. 11, 2015 (JP) ................. 2015-048231

(51) Int. Cl.
*B29C 43/12* (2006.01)
*B29C 70/44* (2006.01)
(Continued)

(52) U.S. Cl.
CPC ............ *B29C 43/12* (2013.01); *B29C 35/007* (2013.01); *B29C 35/0238* (2013.01);
(Continued)

(58) Field of Classification Search
None
See application file for complete search history.

(56) References Cited

U.S. PATENT DOCUMENTS

| 4,872,827 A | 10/1989 | Noda |
| 8,828,309 B2 | 9/2014 | Ashida |
| 2012/0133067 A1* | 5/2012 | Ashida ................. B29C 35/04 |
| | | 264/40.3 |

FOREIGN PATENT DOCUMENTS

| CN | 102529121 A | 7/2012 |
| DE | 37 43 809 A1 | 1/1989 |

(Continued)

OTHER PUBLICATIONS

Extended European Search Report dated Aug. 11, 2016, in EP Patent Application No. 16155146.0.
(Continued)

*Primary Examiner* — Monica A Huson
(74) *Attorney, Agent, or Firm* — McGinn IP Law Group, PLLC (57) ABSTRACT

According to one implementation, a molding equipment of a composite material includes a vessel, a decompression system and a heating medium supply system. The vessel houses a molding target sealed by a sealing object. The decompression system performs bending forming of the molding target and pressurization on the molding target after the bending forming by decompressing a region surrounded by the sealing object in the vessel. The heating medium supply system supplies a heating medium into the vessel. The heating medium is supplied for the bending forming, and heating and curing of the molding target under the pressurization.

20 Claims, 5 Drawing Sheets

(51) Int. Cl.
*B29C 35/00* (2006.01)
*B29C 35/02* (2006.01)
*B29C 43/52* (2006.01)
*B29C 43/56* (2006.01)
*B29C 43/58* (2006.01)
*B29K 105/08* (2006.01)
*B29K 105/00* (2006.01)

(52) U.S. Cl.
CPC .............. *B29C 43/52* (2013.01); *B29C 43/56* (2013.01); *B29C 43/58* (2013.01); *B29C 70/44* (2013.01); *B29C 2043/562* (2013.01); *B29C 2043/5808* (2013.01); *B29C 2043/5816* (2013.01); *B29K 2105/0872* (2013.01); *B29K 2105/256* (2013.01)

(56) References Cited

FOREIGN PATENT DOCUMENTS

| | | |
|---|---|---|
| EP | 2 457 708 A1 | 5/2012 |
| JP | 01-099612 U | 7/1989 |
| JP | H05-060698 U | 8/1993 |
| JP | H07-060770 A | 3/1995 |
| JP | 2009-184239 A | 8/2009 |
| JP | 2009-220392 A | 10/2009 |
| JP | 2012-153133 A | 8/2012 |
| WO | WO 96/06725 A1 | 3/1996 |

OTHER PUBLICATIONS

Miracle D B et al., "Curing", ASM Handbook—Composites, ASM International Materials Park, Ohio, USA, pp. 486-491, XP002563889.
European Office Action dated Aug. 6, 2018.
Chinese Office Action dated Feb. 20, 2019, in Chinese Patent Application No. 201610134156.8 with an English translation.
Japanese Office Action dated Mar. 5, 2019, in Japanese Patent Application No. 2015-048231 with an English translation.
Second European Office Action dated Mar. 15, 2019, in European Patent Application No. 16 155 146.0.

\* cited by examiner

MOLDING EQUIPMENT OF COMPOSITE MATERIAL AND MOLDING METHOD OF COMPOSITE MATERIAL

CROSS REFERENCES TO RELATED APPLICATIONS

This application is based upon and claims the benefit of priority from Japanese Patent Application No. 2015-048231, filed on Mar. 11, 2015; the entire contents of which are incorporated herein by reference.

FIELD

Implementations described herein relate generally to molding equipment of a composite material and a molding method of a composite material.

BACKGROUND

Conventionally, as a method of molding a composite material, such as CFRP (carbon fiber reinforced plastics) and GFRP (glass fiber reinforced plastics), a method of using A/C (autoclave) molding equipment is known.

In a molding method using the conventional autoclave molding equipment, sheet-like prepregs are laminated on a jig (a mold or a molding jig) which fits a shape of a finished product. Next, the sheet-like prepregs are covered using a bag film, a sealant and so on. Subsequently, a region covered by the bag film and the sealant is made into a vacuum state. Thereby, the prepregs covered by the bag film and the sealant become in a pressurized state by the atmospheric pressure. The work that seals prepregs by vacuuming with a bag film and a sealant is called bagging. Next, the prepregs after the bagging are conveyed in autoclave molding equipment. Then, the prepregs are cured by heating using the autoclave molding equipment. Thereby, the cured prepregs are obtained as a molded product of a composite material.

In the case of molding a composite material using the conventional autoclave molding equipment, prepregs are heated and cured by a circulation of hot air. Nitrogen may also be filled for a purpose of an increase in pressure and inactivation under a high temperature. However, it is difficult for the conventional autoclave molding equipment, which heats a molded product by hot air, to improve low uniformity of temperature and raise temperature instantly. The low uniformity of temperature leads to deterioration of an appearance or an internal quality of a molded product. Therefore, it is difficult for the conventional autoclave molding equipment, which heats a molded product by hot air, to cure a molded product, having a complicated structure, or a molded product, having a large size, uniformly in a satisfactory quality.

Thus, autoclave molding equipment which heats a molded product by steam instead of hot air has been devised (for example, refer to Japanese Patent Application Publication JP 2012-153133 A). In the case of using steam as a heating medium by a heat transfer, uniformity of temperature can be dramatically improved compared to the case of using hot air or nitrogen. Therefore, in the case of using the autoclave molding equipment which heats a molded product with steam, even a product having a complicated structure can also be molded.

Specifically, when shaping of prepregs is previously performed by a shaping device, even a molded product, having a complicated structure, can be heated and cured using steam type autoclave molding equipment. The shaping of prepregs by a shaping device is typically shaping processing which warms laminated sheet-like prepregs to a temperature appropriate for the shaping and subsequently shapes the warmed sheet-like prepregs. Therefore, sheet-like prepregs shaped by a shaping device are heated and cured by steam type autoclave molding equipment. Note that, the forming of prepregs before curing of the prepregs is generally called "shaping" in order to distinguish from the forming of prepregs by curing of the prepregs.

An object of the present invention is to manufacture a molded product of a composite material, having a complicated structure, more simply.

SUMMARY OF THE INVENTION

In general, according to one implementation, molding equipment of a composite material includes a vessel, a decompression system and a heating medium supply system. The vessel houses a molding target sealed by a sealing object. The decompression system performs bending forming of the molding target and pressurization on the molding target after the bending forming by decompressing a region surrounded by the sealing object in the vessel. The heating medium supply system supplies a heating medium into the vessel. The heating medium is supplied for the bending forming, and heating and curing of the molding target under the pressurization.

Further, according to one implementation, a molding method of a composite material is for manufacturing a molded product of the composite material using the above-mentioned molding equipment of the composite material.

Further, according to one implementation, a molding method of a composite material includes: carrying a molding target, sealed by a sealing object, into a vessel; heating the molding target by supplying a heating medium into the vessel, and performing bending forming of the molding target by decompressing a region surrounded by the sealing object in the vessel; and heating and curing the molding target after the bending forming. The molding target is heated and cured under a pressurization. The molding target is heated and cured by the heating medium.

DETAILED DESCRIPTION

Molding equipment of a composite material and a molding method of a composite material according to implementations of the present invention will be described with reference to the accompanying drawings. (Configuration and Function)

Figure 1:
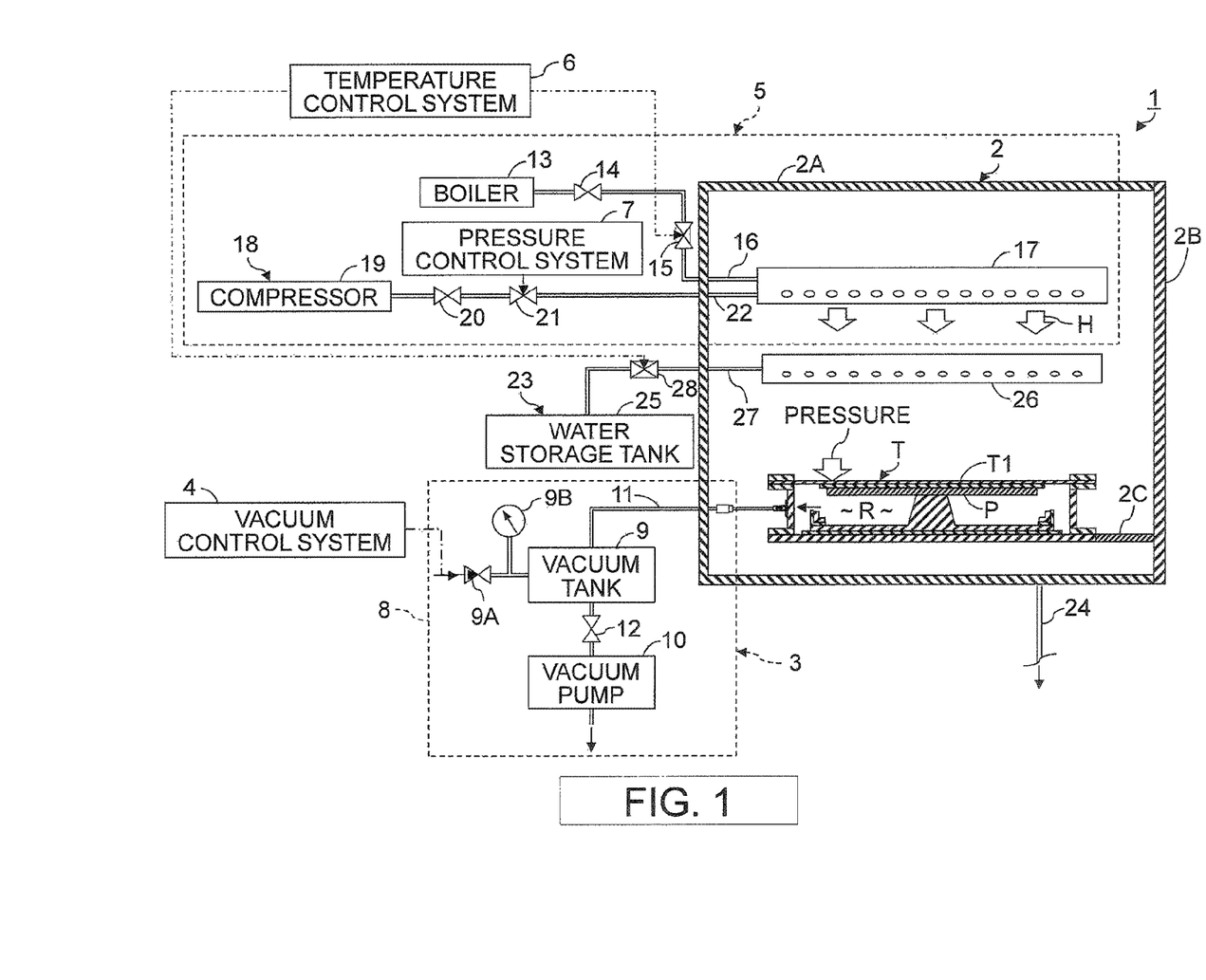
FIG. 1 is a configuration diagram of molding equipment of a composite material according to an implementation of the present invention.

FIG. 1 is a configuration diagram of molding equipment of a composite material according to an implementation of the present invention.

Molding equipment 1 of a composite material is autoclave molding equipment which performs both bending forming, and heating and curing of a target to be molded of a composite material. Arbitrary gas, such as heated air, heated nitrogen, heated steam, or mixed gas of these gases, can be used as a heating medium H for heating a composite material (prepreg P) before curing, which is a target of molding.

In particular, using steam as the heating medium H can make a temperature distribution uniform, compared to a case of using heated air or heated nitrogen as the heating medium H. Furthermore, using steam as the heating medium H can raise a temperature instantly, compared to a case of using heated air or heated nitrogen as the heating medium H. It can be considered that this is because released heat from steam, due to a characteristic of the water vapor of releasing retained latent heat at the moment that the water vapor is condensed into liquid, is transferred to an object to be heated in an instant. The latent heat has an amount of heat from twice to five times as much as that of sensible heat. Therefore, it is obvious that using steam as the heating medium H is more effective than using heated air or heated nitrogen as the heating medium H, from a viewpoint to raise a temperature of an object to be heated instantly.

Therefore, using steam, such as saturated steam, superheated steam, or wet steam, as the heating medium H has efficacy. Saturated steam is steam at the temperature at which water begins to evaporate, i.e. the saturation temperature. Steam having a temperature more than the saturation temperature is called superheated steam, and steam including water and/or water droplets is generally called wet steam.

Furthermore, steam in which air or nitrogen is mixed can also be used so that only a pressure of the steam can be raised without raising a temperature of steam. Specifically, in the case of saturated steam, the saturation pressure corresponding to the saturation temperature is uniquely determined as the upper limit of pressure. Meanwhile, in the case of mixing air or nitrogen, whose pressure is higher than the saturation pressure, into the steam, the pressure of steam can be controlled to be higher than the saturation pressure.

On the other hand, heating saturated steam can obtain superheated steam, whose temperature is higher than the saturation temperature, without changing the pressure. Therefore, when superheated steam is used, the temperature of steam can be controlled to be higher than the saturation temperature. This means that control of the steam in a low pressure becomes possible when the temperature is constant.

That is, when steam generated by superimposing air or nitrogen, whose pressure is higher than the saturation pressure, on saturated steam, or superheated steam is used as the heating medium H, a controllable pressure range can be extended compared to the case of using only saturated steam.

The similar applies to a temperature. When steam generated by superimposing air or nitrogen, whose temperature is lower than the saturation temperature, on saturated steam, or superheated steam is used, a controllable temperature range can be extended compared to the case of using only saturated steam. Specifically, while the upper limit of temperature of saturated steam is uniquely determined as the saturation temperature corresponding to the saturation pressure, superheated steam allows obtaining steam, whose temperature is higher than the saturation temperature, as the heating medium H, without changing a pressure. Furthermore, when air or nitrogen whose temperature is lower than the saturation temperature is superimposed on saturated steam, steam whose temperature is lower than the saturation temperature can be obtained as the heating medium H without changing a pressure.

Therefore, when superheated steam generated by mixing steam with air or nitrogen is used as the heating medium H, a wider temperature control range and pressure control range can be secured. Thereby, adjusting a pressure and a temperature of the heating medium H becomes easy.

Hereinafter, a case where the molding equipment 1 is autoclave molding equipment using steam as the heating medium H will be described. In that case, the molding equipment 1 can be composed of a vessel 2, a decompression system 3, a vacuum control system 4, a heating medium supply system 5, a temperature control system 6, and a pressure control system 7, as elements.

The vessel 2 is an element for housing the prepregs P which is a target of molding. Specifically, the vessel 2 forms a molding room (chamber) of a product to be molded. When the heating medium H is steam, the vessel 2 is usually composed of a Class-1 pressure vessel. Meanwhile, when the heating medium H is heated gas, such as heated air or heated nitrogen, the vessel 2 is usually composed of a Class-2 pressure vessel. The vessel 2 exemplified in FIG. 1 has a structure having a cylindrical structure 2A, of which one end has been closed, and a disk-shaped door 2B, which can be opened and closed, attached to the opening end side of the cylindrical structure 2A. Furthermore, a holding member 2C for holding a molding target is installed inside the door 2B.

The prepreg P which is a molding target is placed in the vessel 2, in a state where the prepreg P has been set on a molding jig T. Specifically, the prepreg P carried into the vessel 2 is set on a rigid jig, having a shape corresponding to a shape after molding, together with a subsidiary material, such as a mold release film. Next, the set prepreg P is sealed by a sealing object T1, such as a silicone rubber bag, having followability. Then, the molding jig T on which the prepreg P has been set is fixed in the vessel 2 by the holding member 2C.

The decompression system 3 decompresses a decompression region R surrounded by the sealing object T1 in the vessel 2. The decompression system 3 can be composed of a vacuum circuit and the like. The decompression system 3 can perform bending forming of the prepreg P and pressurization on the prepreg P at the time of heating and curing after the bending forming by decompressing the decompression region R surrounded by the sealing object T1. A pressure appropriate for the bending forming of the prepreg P is different from that for the heating and curing of the prepreg P. In general, it is necessary to apply a larger pressure on the prepreg P, at the time of the heating and curing of the prepreg P, than a pressure which is applied on the prepreg P for the bending forming of the prepreg P.

Therefore, the decompression system 3 has a function to decompress the decompression region R surrounded by the sealing object T1 to a pressure appropriate for the bending forming of the prepreg P and subsequently decompress the decompression region R to a pressure appropriate for the heating and curing of the prepreg P. The decompression region R surrounded by the sealing object T1 may be decompressed to different pressures in incremental steps, or may be decompressed so that the pressure in the decompression region R surrounded by the sealing object T1 changes continuously. Furthermore, in the case of decompressing the decompression region R surrounded by the sealing object T1 to different pressures in incremental steps, the pressure between the different pressures may change continuously, or may change in a stepwise manner.

The pressure applied on the prepreg P is the differential pressure between a pressure of the heating medium H applied on the prepreg P from the outside of the sealing object T1 in the vessel 2 and a pressure in the space between the sealing object T1 and the prepreg P. Therefore, the pressure in the vessel 2 may also be controlled in addition to the pressure in the decompression region R surrounded by the sealing object T1. Specifically, at least one of the pressurization for the bending forming of the prepreg P and the pressurization for curing of the prepreg P after the bending forming can be performed by controlling a pressure of the heating medium H in the vessel 2. In that case, the pressure of steam supplied as the heating medium H in the vessel 2 is to be controlled.

An appropriate time change in differential pressure between the pressure of steam and the pressure in the decompression region R surrounded by the sealing object T1 changes depending on a size and structure of a product to be molded. Therefore, an appropriate time change in pressure in the decompression region R surrounded by the sealing object T1 can be determined empirically by tests actually using a test piece of the prepreg P. Alternatively, an appropriate time change in pressure in the decompression region R surrounded by the sealing object T1 may also be estimated by simulations. The similar applies to a time change in pressure of steam.

Hereinafter, a case where the pressure of steam can be considered as the atmospheric pressure will be described mainly. As a matter of course, the similar applies to a case where the pressure of the steam cannot be considered as the atmospheric pressure. Specifically, when the pressure of steam cannot be considered as the atmospheric pressure, both the pressure of the steam and the pressure in the decompression region R surrounded by the sealing object T1 have only to be control targets so that the differential pressure between the pressure of the steam and the pressure in the decompression region R surrounded by the sealing object T1 becomes a controlling value.

The decompression system 3 can be composed using variable vacuum equipment 8 which can temporally change the degree of vacuum (negative pressure) in the decompression region R surrounded by the sealing object T1. In the example shown in the figure, the variable vacuum equipment 8 includes a vacuum tank 9 and a vacuum pump 10 coupled by vacuum piping 11. The vacuum pump 10 discharges air in the vacuum tank 9. A vacuum adjusting valve 9A and a vacuum meter 9B are attached to the vacuum tank 9.

The vacuum adjusting valve 9A is disposed at an entrance for making the atmosphere flow into the vacuum tank 9. Therefore, a flow rate of air which flows into the vacuum tank 9 can be adjusted by adjusting the opening of the vacuum adjusting valve 9A. The vacuum meter 9B is disposed at a position at which the degree of vacuum in the vacuum tank 9 can be measured.

Therefore, the degree of vacuum in the vacuum tank 9 can be adjusted by adjusting the opening of the vacuum adjusting valve 9A, with discharging the air in the vacuum tank 9 by the vacuum pump 10. Note that, the degree of vacuum in the vacuum tank 9 may be adjusted by adjusting the opening of a valve 12 which is usually disposed between the vacuum pump 10 and the vacuum tank 9.

The inside of the vacuum tank 9 is coupled to the inside of the decompression region R, which is a vacuum region, surrounded by the sealing object T1, by the vacuum piping 11. Therefore, the degree of vacuum in the decompression region R surrounded by the sealing object T1 which seals the prepreg P becomes equivalent to the degree of vacuum in the vacuum tank 9. As a result, the degree of vacuum in the decompression region R surrounded by the sealing object T1 can be variably controlled.

Therefore, the bending forming of the prepreg P, and the heating and curing of the prepreg P under pressurization can be performed with manually adjusting the degree of vacuum in the decompression region R surrounded by the sealing object T1, with referring to the vacuum meter 9B. Thereby, the bending forming of the prepreg P, and the heating and curing of the prepreg P under pressurization can be performed under a pressure condition depending on a variety of sizes and structures of a product to be molded. Once a time change of the degree of vacuum appropriate for the bending forming and the curing can be obtained as a pressure condition by tests using a test piece or the like, a product to be molded having a same or similar size and structure can be molded under the same pressure condition. Specifically, when a time change of the degree of vacuum appropriate for a size and structure of a certain product to be molded can be obtained by molding tests, a change of the degree of vacuum for the bending forming and the curing of another product to be molded having a same or similar size and structure can be automatically controlled.

The vacuum control system 4 automatically controls the degree of vacuum in the decompression region R surrounded by the sealing object T1. Specifically, the vacuum control system 4 has a function to control the decompression system 3 so that the decompression region R surrounded by the sealing object T1 in the vessel 2 is decompressed to a pressure appropriate for the bending forming of the prepreg P, and subsequently to a pressure appropriate for the heating and curing of the prepreg P. The vacuum control system 4 can be configured by a computer reading a control program of the decompression system 3. That is, circuits can be used to configure the vacuum control system 4.

When the decompression system 3 is composed of the variable vacuum equipment 8 as shown in the figure, the degree of opening of the vacuum adjusting valve 9A attached to the vacuum tank 9 can be automatically controlled by the vacuum control system 4. Alternatively, the degree of opening of the valve 12 disposed between the vacuum pump 10 and the vacuum tank 9 may also be automatically controlled by the vacuum control system 4.

A time change of the degree of vacuum for generating control signals of the degree of opening of the vacuum adjusting valve 9A can be previously stored for every size and structure of a product to be molded as a table or a function in the vacuum control system 4. Specifically, information which relates at least one of sizes and structures of molding targets with time changes in pressure in the decompression region R surrounded by the sealing object T1 can be stored in a storage unit included in the vacuum control system 4. Thus, a pressure depending on a size and structure of a molding target can be automatically controlled by referring to the information stored in the storage unit.

Figure 2:
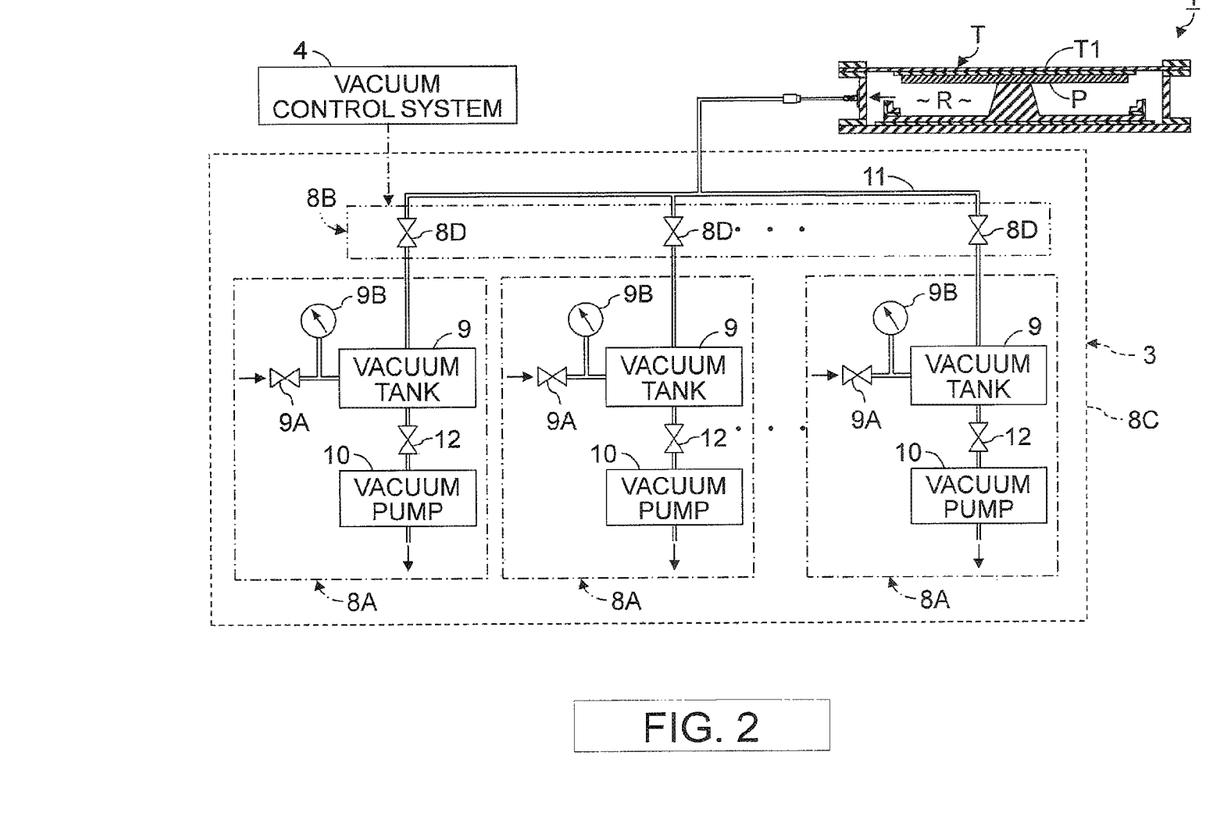
FIG. 2 shows a modification of the decompression system shown in FIG. 1.

FIG. 2 shows a modification of the decompression system 3 shown in FIG. 1.

When a pressure in the decompression region R surrounded by the sealing object T1 is repeatedly controlled to be plural pressure control values, a dedicated vacuum circuit may also be formed so that the pressure in the decompression region R surrounded by the sealing object T1 can be easily switched to the pressure control values. Specifically, plural decompression subsystems 8A which decompress the decompression region R surrounded by the sealing object T1 to different pressures respectively can be installed as exemplified in FIG. 2. Then, the decompression system 3 can also be configured by variable vacuum equipment 8C which switches the decompression subsystems 8A by a switching structure 8B.

Each decompression subsystem 8A can be composed of the vacuum tank 9, to which the vacuum adjusting valve 9A and the vacuum meter 9B are coupled, the vacuum pump 10 and the valve 12 coupled through the vacuum piping 11. Thus, the pressure in the vacuum tank 9 of each decompression subsystem 8A can be set to a predetermined pressure by driving the vacuum pump 10, adjusting the opening of the vacuum adjusting valve 9A and the like.

The switching structure 8B can be composed of valves 8D which open and close the decompression subsystems 8A respectively, for example. Then, the decompression subsystem 8A to be coupled to the decompression region R surrounded by the sealing object T1, through the vacuum piping 11, can be switched sequentially by controlling opening and closing of the valves 8D by the vacuum control system 4. In this case, a control target by the vacuum control system 4 is the switching structure 8B of the variable vacuum equipment 8C. Furthermore, timing information for switching the switching structure 8B and information specifying the decompression subsystem 8A are expressed by control signals.

The heating medium supply system 5 supplies the heating medium H for the bending forming of the prepreg P, which is a molding target, and for the heating and curing of the prepreg P after the bending forming, into the vessel 2. The heating medium supply system 5 can be composed of a gas supply circuit including piping of the heating medium H. In the case of supplying steam, such as saturated steam, as the heating medium H, it is necessary to generate at least steam having a predetermined temperature and pressure. Therefore, the heating medium supply system 5 can be composed of a boiler 13, a steam pressure reducing valve 14, a steam introduction automatic valve 15, and other equipment, coupled by steam supply piping 16. The boiler 13 generates steam having a predetermined temperature. The steam pressure reducing valve 14 decompresses a vapor pressure of the steam generated in the boiler 13, from the initial pressure down to a predetermined pressure. The steam introduction automatic valve 15 adjusts the amount of supply of the steam. A nozzle 17 is attached to the end of the steam supply piping 16, and the nozzle 17 is disposed in the vessel 2.

In the case of supplying steam in which air or nitrogen is mixed as the heating medium H, it is necessary to mix mixed gas, such as air or nitrogen, into steam. For that purpose, the heating medium supply system 5 includes a mixed gas supply system 18. The mixed gas supply system 18 can be composed of a compressor 19, a mixed gas reducing valve 20, and a switching valve 21, coupled by mixed gas piping 22, for example. The compressor 19 generates compressed air or compressed nitrogen. The mixed gas reducing valve 20 decompresses the initial pressure of the compressed air or the compressed nitrogen, generated in the compressor 19, down to a predetermined pressure. The switching valve 21 adjusts the mixed quantity of the compressed air or the compressed nitrogen.

In the example shown in the figure, the mixed gas piping 22 has been coupled to the nozzle 17 for supplying steam. That is, mixed gas and steam are ejected from the common nozzle 17 into the vessel 2. Therefore, steam in which mixed gas is mixed is ejected from the common nozzle 17 into the vessel 2. Note that, a dedicated nozzle used for ejecting mixed gas into the vessel 2 may also be disposed in the vessel 2, in addition to the nozzle for steam. In that case, mixed gas and steam are ejected from nozzles into the vessel 2 respectively. Then, the mixed gas is mixed with the steam, in the vessel 2.

The heating medium H supplied from the heating medium supply system 5 into the vessel 2 needs to be recovered. For that purpose, the molding equipment 1 has a cooling water supply system 23 and a drain (drainpipe) 24. The cooling water supply system 23 supplies cooling water into the vessel 2. The cooling water supply system 23 can be composed of a water storage tank 25 and a cooling water nozzle 26 coupled by cooling water piping 27, for example. A cooling-water introduction automatic valve 28 can be disposed between the water storage tank 25 and the cooling water nozzle 26, in order to adjust the supplied amount of cooling water.

When cooling water is supplied into the vessel 2, a molded product can be cooled and steam can be liquefied. On the other hand, the drain 24 is coupled to the bottom of the vessel 2. Therefore, steam supplied into the vessel 2 is cooled by cooling water and can be recovered from the drain 24 as liquid water. The drain 24 can also be used for exhausting gas, such as air, steam, and mixed gas.

The temperature control system 6 has a function to set a control value of temperature of the heating medium H to a value appropriate for bending forming of a molding target, and subsequently, to a value appropriate for heating and curing of the molding target. The temperature control of the heating medium H can be performed by automatic control of the steam flow by the steam introduction automatic valve 15, which is in the downstream side of the steam pressure reducing valve 14 coupled to the boiler 13, or another valve, for example. Note that, when the heating medium H is saturated steam, a temperature of the heating medium H may be controlled by controlling a vapor pressure. Furthermore, temperature control in the vessel 2 at the time of cooling can be performed by automatic control of a flow rate of cooling water by the cooling-water introduction automatic valve 28.

The pressure control system 7 has a function to control a pressure of the heating medium H in the vessel 2 by adjusting the amount of mixed gas, such as air or nitrogen, mixed with steam, supplied into the vessel 2. Therefore, in the case of using only saturated steam as the heating medium H, the pressure control system 7 is in the shutdown state. Even when only saturated steam is used as the heating medium H, the pressure control system 7 operates when it is necessary to keep a pressure in the vessel 2 at the time of cooling in the vessel 2.

In the case of using mixed gas in addition to steam as the heating medium H, a control value of pressure of the heating medium H is set to a value appropriate for bending forming of a molding target, and subsequently, to a value appropriate for heating and curing of the molding target. Note that, a pressure of the heating medium H at the time of bending forming of a molding target and a pressure of the heating medium H at the time of heating and curing of the molding target may be set to a same control value. When a control value of pressure of the heating medium H is set larger than the atmospheric pressure, pressurization for bending forming of the prepreg P and pressurization for curing of the prepreg P after the bending forming can be performed by not only a negative pressure in the decompression region R but also the pressure of the heating medium H, as described above.

The supplied amount of mixed gas into the vessel 2 can be adjusted by controlling the switching valve 21 disposed in the mixed gas supply system 18. As a matter of course, other equipment may be disposed to be controlled as long as the supplied amount of mixed gas into the vessel 2 can be adjusted.

The temperature control system 6 and the pressure control system 7 can also be configured by circuits such as a computer reading a program, similarly to the vacuum control system 4. It is practical to control each of a temperature of the heating medium H, a pressure of the heating medium H, and the degree of vacuum in the decompression region R between the sealing object T1 and the prepreg P, which are control targets in the molding equipment 1, by feedback control, such as PID (Proportional-Integral-Derivative) control.

For that purpose, a thermometer, such as a thermocouple, for measuring a temperature of the heating medium H, a pressure gauge for measuring a pressure of the heating medium H, and a vacuum gauge for measuring the degree of vacuum in the decompression region R between the sealing object T1 and the prepreg P can be disposed at appropriate and arbitrary positions, respectively. It is practical to dispose plural thermometers and plural pressure gauges at positions in the vessel 2 so that a temperature distribution and a pressure distribution of the heating medium H can be measured. When the vacuum meter 9B is disposed near the vacuum adjusting valve 9A which is an operation portion of the variable vacuum equipment 8 as exemplified in FIG. 1, adjustment becomes easy with checking the degree of vacuum.

The molding equipment 1 exemplified in FIG. 1 shows an example case where steam is the heating medium H. Alternatively, when heated gas, such as warm air or heated nitrogen, other than steam is the heating medium H, equipment, such as a circulating structure for circulating the heating medium H and/or a cooler, depending on a type of the heating medium H is disposed as an element or elements of the molding equipment 1. The circulating structure of the heating medium H can be composed of a known structure, such as a fan driven by a motor.

(Operation and Action)

Next, a molding method of composite material for manufacturing a molded product of composite material using the molding equipment 1 of composite material will be described. An example case where steam is used as the heating medium H will be described here.

Figure 3:
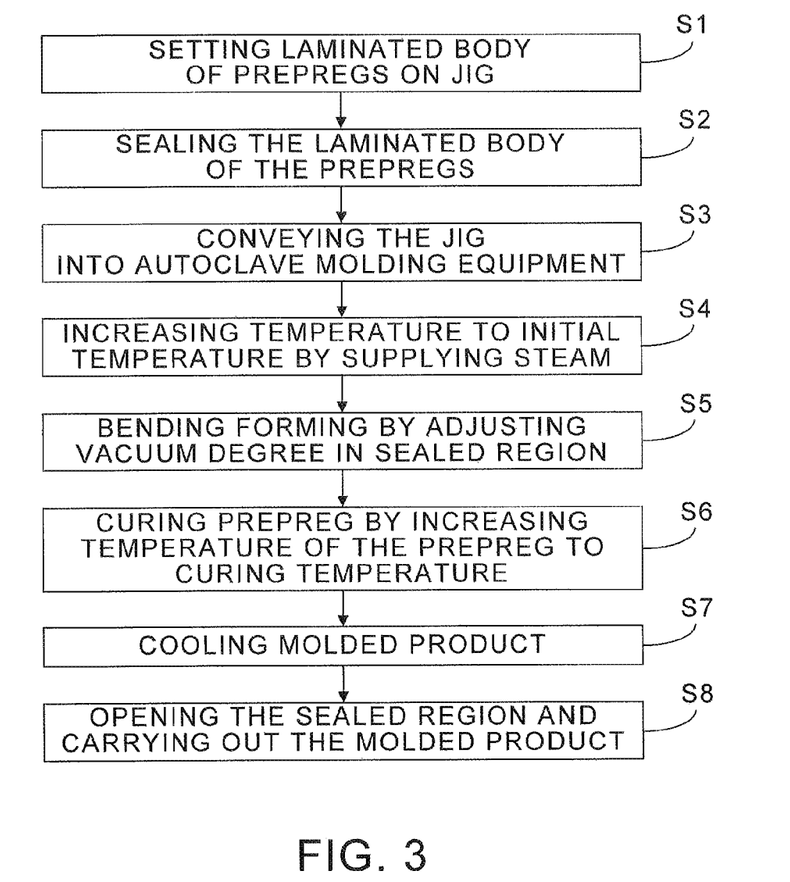
FIG. 3 is a flow chart showing molding processes of a composite material by the molding equipment shown in FIG. 1.
Figure 4:
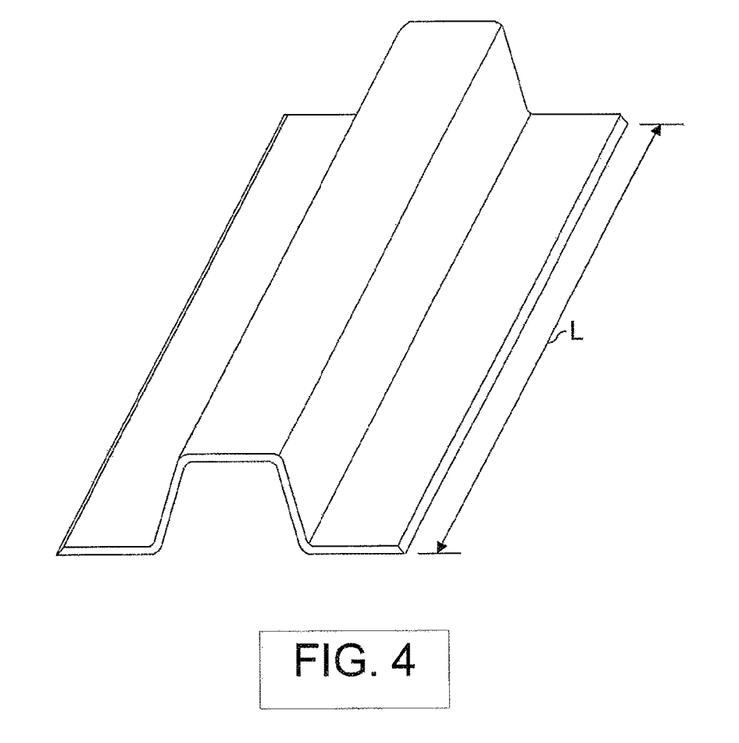
FIG. 4 is a perspective view showing an example of structure of a composite material molded product after molding by the molding equipment shown in FIG. 1.
Figure 5:
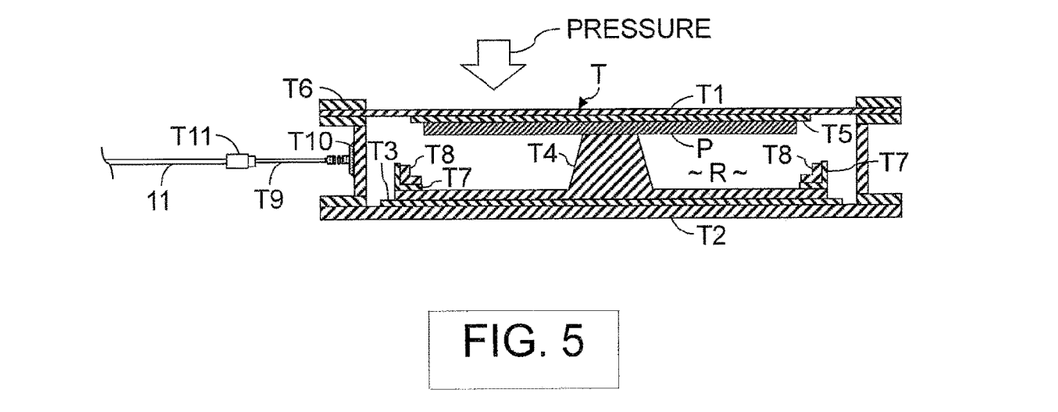
FIG. 5 is a longitudinal sectional view showing an example of structure of the molding jig for forming the composite material molded product exemplified in FIG. 4 by the molding equipment.

FIG. 3 is a flow chart showing molding processes of a composite material by the molding equipment 1 shown in FIG. 1. FIG. 4 is a perspective view showing an example of structure of a composite material molded product after molding by the molding equipment 1 shown in FIG. 1. FIG. 5 is a longitudinal sectional view showing an example of structure of the molding jig T for forming the composite material molded product exemplified in FIG. 4 by the molding equipment 1.

Firstly, in step S1, a laminated body of the prepregs P is set on the molding jig T. For example, in the case of molding a platy composite material whose length in the longitudinal direction is L and which has been bent to form concavity and convexity as exemplified in FIG. 4, the molding jig T having a structure as shown in FIG. 5 can be used.

More specifically, a breather cloth T3, as a sheet for ventilation, is laid on a box shape jig T2 on which mold release treatment has previously been performed. Next, a rigid jig T4 on which mold release treatment has previously been performed is placed in the box shape jig T2. The rigid jig T4 has a shape which fits a shape of a molded product. Therefore, a longitudinal section of the rigid jig T4 shown in FIG. 5 has a hat shape to fit the shape of the composite material molded product shown in FIG. 4. As a matter of course, depending on a shape of a composite material molded product, a shape of a longitudinal section of the rigid jig T4 can be one of a variety of shapes, such as an L shape or a C shape.

Furthermore, works, such as a work to fill nut attaching parts of the rigid jig T4 with tape and curing silicone rubber, a work to set an auxiliary jig, such as a spacer, a work to lay the breather cloths T3 on the side surfaces of the rigid jig T4, and the like are done as necessary.

Each jig which requires rigidity, such as the box shape jig T2 and the rigid jig T4, can be made of an arbitrary material having necessary rigidity and heat resistance. Therefore, the box shape jig T2 and the rigid jig T4 may be made of not only metal but also plastic or a composite material.

When preparation of the rigid jig T4 side is completed, the laminated body of the sheet prepregs P is placed on the rigid jig T4. Next, a release film (mold release film) T5 for preventing adhesion due to heating is attached so as to cover the laminated body of the prepregs P.

Next, in step S2, the laminated body of the prepregs P is sealed by the sealing object T1. The sealing object T1 can be made of an arbitrary material, such as silicone rubber, having flexibility. When the prepregs P are bagged with a silicone rubber bag, the silicone rubber bag is laid on the laminated body. Subsequently, an outer frame T6 is put on the silicone rubber bag and clamped with a vise so as to prevent an interspace between the silicone rubber bag and the box shape jig T2. At this time, it is important to clamp the outer frame T6 to the box shape jig T2 side to an extent that an end of the silicone rubber bag protruding from the outer frame T6 is not displaced even if the end of the silicone rubber bag is pulled.

As exemplified in FIG. 5, breather cloths T7 may be laid on the four corners of the laminated body of the prepregs P and the four corners of the laminated body of the prepregs P may be protected by silicone rubber sheets T8 on the breather cloths T7 in order to prevent entrainment or damage of the sealing object T1, such as the silicone rubber bag.

Next, in step S3, the molding jig T on which the laminated body of the prepregs P has been set is conveyed into the vessel 2 of the autoclave molding equipment. That is, a molding target of a composite material sealed by the sealing object T1 is carried into the vessel 2.

Then, a vacuum hose T9 for vacuuming is coupled to a vacuum mouthpiece T10. The vacuum hose T9 is also coupled to the vacuum piping 11 with a coupler T11. Thereby, the vacuum tank 9 and the vacuum pump 10 of the variable vacuum equipment 8 are coupled to the space formed between the laminated body of the prepregs P and the sealing object T1, such as a silicone rubber bag. That is, preparation to perform vacuuming of the decompression region R surrounded by the sealing object T1 is completed.

Furthermore, temperature sensors, such as thermocouples, are attached on required positions. When necessary preparation before autoclave processing of the molding target is completed, the door 2B of the vessel 2 is closed.

Next, in step S4, operation of the autoclave molding equipment is started. Firstly, the temperature inside the vessel 2 is increased to the initial temperature by supplying steam into the vessel 2. Thereby, the molding jig T and the prepreg P are heated by a heat transfer by the steam. When the heating medium H is saturated steam, it is appropriate to set a temperature control value in the vessel 2 to not more than 100° C. in order to eliminate air bubbles included in the prepreg P under the atmospheric pressure. Furthermore, mixed gas, such as air or nitrogen, may be mixed into the steam in order to adjust the pressure in the vessel 2. In particular, increasing the pressure in the vessel 2 can obtain an effect to seal in air bubbles included in the prepreg P.

The steam is generated in the boiler 13. The generated steam passes through the steam supply piping 16 and is supplied from the nozzle 17 into the vessel 2. The pressure of the steam supplied in the vessel 2 is previously adjusted by the steam pressure reducing valve 14 disposed on the steam supply piping 16. Temperature control of the steam can be performed by the steam introduction automatic valve 15 controlled by the temperature control system 6.

In the case of mixing mixed gas, such as compressed air or compressed nitrogen, into the steam, the mixed gas is generated in the compressor 19. The generated mixed gas passes through the mixed gas piping 22 and is supplied from the nozzle 17 into the vessel 2. Thereby, the mixed gas is mixed with the steam. The supplied amount of the mixed gas can be adjusted by controlling the switching valve 21 disposed on the mixed gas piping 22. The degree of opening of the switching valve 21 can be automatically controlled by the pressure control system 7.

Next, in step S5, bending forming of the prepreg P is performed by adjusting the degree of vacuum in the decompression region R sealed by the sealing object T1, such as a silicone rubber bag. Specifically, the prepreg P which is a molding target is heated by supplying the steam into the vessel 2. Meanwhile, the bending forming of the prepreg P is performed by decompressing the decompression region R surrounded by the sealing object T1 in the vessel 2, by the decompression system 3.

Therefore, adjustment of the degree of vacuum is started at the time when the temperature of the prepreg P is increased up to a temperature appropriate for the bending forming. The temperature appropriate for the bending forming of the prepreg P, which changes depending on a material of the prepreg P, can be considered to be approximately from 80° C. to 100° C.

A laminated object of the sheet-like prepregs P having a size of 500 mm×350 mm was actually set in the vessel 2 and heated with saturated steam in order to manufacture a composite material molded product having a structure as shown in FIG. 4 whose length L is approximately from 500 mm to 600 mm. As a result, the temperature increased up to at least 90° C., which is enough for the bending forming, in about 10 minutes after the start of operation of the molding equipment 1. Note that, the temperature of the rigid jig T4 made of metal were measured by a thermocouple and the temperature of the rigid jig T4 was considered as the temperature of the prepreg P.

The degree of vacuum in the decompression region R bagged by the sealing object T1 is controlled to gradually increase. Specifically, the pressure in the bag surrounded by the sealing object T1, such as a silicone rubber bag, is controlled to be gradually lowered. Then, a differential pressure between the atmospheric pressure or a pressure in the vessel 2 adjusted by mixing mixed gas, and the pressure in the bag is applied on the sealing object T1. Therefore, the sealing object T1 bending by gravity gradually adheres to the prepreg P, and comes to apply a pressure on the prepreg P. Consequently, the gradually increasing differential pressure is applied on the prepreg P. Specifically, the prepreg P heated with the steam is pressurized by the gradually increasing pressure. Thereby, bending forming of the prepreg P under heating and pressurization can be performed.

As described above, the decompression region R bagged by the sealing object T1 may be decompressed so that the pressure in the bag changes continuously, or may be decompressed to different pressures in incremental steps. Since a change in pressure appropriate for bending forming of the prepreg P changes depending on conditions, such as a structure and a size of a composite material molded product, the appropriate change in pressure can be previously obtained by tests or simulations.

As a specific example, a laminated body of the sheet-like prepregs P having a size of 500 mm×350 mm was set in the vessel 2. Then, bending forming of the prepregs P was performed by adjusting the degree of vacuum in six steps with heating the prepregs P with saturated steam so as to obtain the structure as shown in FIG. 4.

Figure 6:
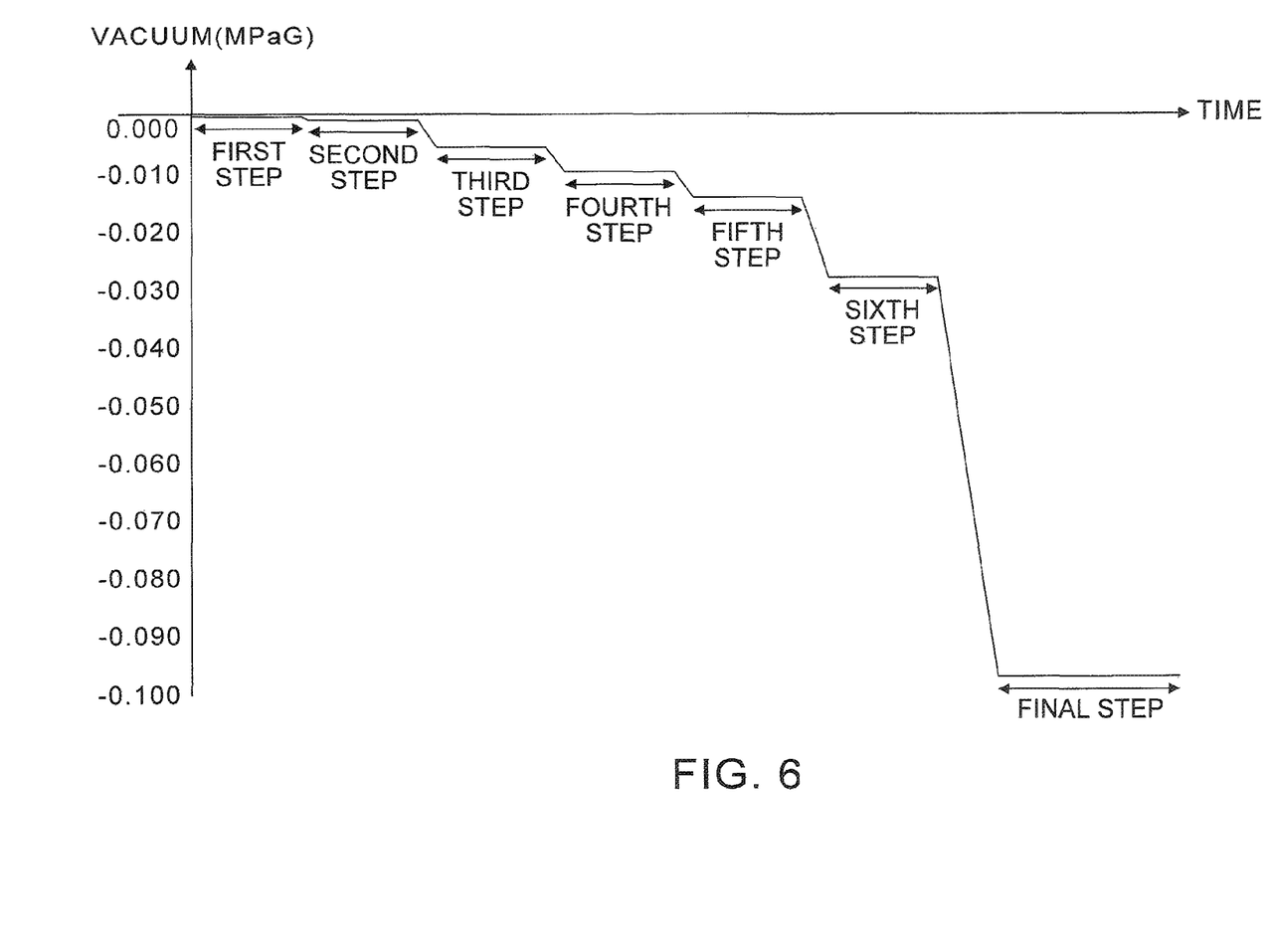
FIG. 6 is a graph showing an example of time change of the degree of vacuum for molding a composite material molded product having the structure exemplified in FIG. 4.

FIG. 6 is a graph showing an example of time change of the degree of vacuum for molding a composite material molded product having the structure exemplified in FIG. 4.

In FIG. 6, the horizontal axis shows time (minute) while the vertical axis shows the degree of vacuum in the decompression region R sealed by the sealing object T1. The degree of vacuum is expressed as a negative pressure (MPaG) to the surrounding pressure. MPaG is a gage pressure of a pressure sensor corresponding to the differential pressure between the pressure in the vessel 2 and the pressure inside the sealing object T1.

As shown in FIG. 6, the bending forming of the prepreg P can be performed by lowering the pressure inside the sealing object T1 in incremental steps. In the first step, the degree of vacuum inside the sealing object T1 is set to the initial pressure between 0.000 and −0.001 MPaG. The decompression inside the sealing object T1 starts from this state. Then, the inside of the sealing object T1 is decompressed and the degree of vacuum inside the sealing object T1 becomes −0.001 MPaG in the second step. This degree of vacuum in the second step is kept for about three minutes. Similarly, the inside of the sealing object T1 is sequentially decompressed to −0.006 MPaG in the third step, −0.010 MPaG in the fourth step, −0.014 MPaG in the fifth step, and −0.028 MPaG in the sixth step. The degree of vacuum in each step is kept for about three minutes. After that, the degree of vacuum inside the sealing object T1 is decompressed to −0.097 MPaG in the final step. The degree of vacuum corresponding to −0.097 MPaG is kept for five minutes.

The above-mentioned variable control of the degree of vacuum can be performed using the variable vacuum equipment 8. In the case of using the variable vacuum equipment 8 exemplified in FIG. 1, the vacuum pump 10 is driven and air in the vacuum tank 9 is discharged at a flow rate depending on the degree of opening of the valve 12. Meanwhile, the degree of opening of the vacuum adjusting valve 9A is adjusted to one corresponding to a targeted degree of vacuum inside the sealing object T1. Then, a difference between a flow rate of the air discharged from the vacuum tank 9 to the outside and a flow rate of the air flowing from the vacuum adjusting valve 9A into the vacuum tank 9 becomes an equilibrium state. Thereby, the degree of vacuum in the vacuum tank 9 becomes a target value.

Therefore, while the degree of vacuum inside the sealing object T1 is lower than the degree of vacuum in the vacuum tank 9, the air inside the sealing object T1 is sucked into the vacuum tank 9 through the vacuum hose T9 and the vacuum piping 11, and discharged to the atmosphere by the vacuum pump 10. As a result, the degree of vacuum inside the sealing object T1 becomes the degree of vacuum in the vacuum tank 9. Therefore, the time required for increasing the degree of vacuum inside the sealing object T1 depends on conditions, such as the performance of the vacuum pump 10 and the airtightness of a vacuum system.

The degree of vacuum can also be automatically controlled. In that case, the variable vacuum equipment 8 is controlled by the vacuum control system 4. In the case of using the variable vacuum equipment 8 exemplified in FIG. 1, the degree of opening of the vacuum adjusting valve 9A is automatically controlled by the vacuum control system 4. Furthermore, the degree of opening of the valve 12 may be automatically controlled by the vacuum control system 4 as necessary.

As described above, plural vacuum paths corresponding to the degrees of vacuum may be disposed, and the degree of vacuum inside the sealing object T1 may also be changed in incremental steps by switching the vacuum paths by a switching structure. For example, in the case of controlling six steps of the degrees of vacuum as shown in FIG. 6, the degree of vacuum inside the sealing object T1 can be controlled by switching six vacuum paths, on which the degrees of opening of valves have been previously adjusted to six steps respectively, by a switching structure. In that case, the degree of vacuum inside the sealing object T1 can be automatically controlled by controlling the switching structure by the vacuum control system 4.

When the bending forming of the prepreg P is completed, the temperature of the prepreg P is increased to a curing temperature in a state where the degree of vacuum inside the sealing object T1 is kept, in step S6. Thereby, the prepreg P after the bending forming is heated and cured in a state where the prepreg P has been pressurized by the steam which is the heating medium H. Actually, bending forming of a laminated body of the sheet-like prepregs P having a size of 500 mm×350 mm was performed, and the prepregs P were able to be cured by increasing the temperature to 180° C. which was kept for 132 minutes.

Next, in step S7, the molded product of composite material obtained by the curing of the prepreg P is cooled. For example, cooling water is supplied into the vessel 2 by the cooling water supply system 23, in a state where the degree of vacuum inside the sealing object T1 is kept. Thereby, the molded product after the curing is cooled to approximately 40° C.

Next, in step S8, the inside of the sealing object T1 is opened to the outside. Therefore, the pressure inside the sealing object T1 becomes the atmospheric pressure. After that, the molded product is carried out of the vessel 2. Furthermore, water liquefied by cooling is discharged to the outside of the vessel 2 through the drain 24.

As described above, the molding equipment 1 of a composite material and the molding method of a composite material allow bending forming of a molding target in addition to curing of the molding target, by adjusting the degree of vacuum in the decompression region R sealed by the sealing object T1 in autoclave processing.

(Effects)

Therefore, the molding equipment 1 of a composite material and the molding method of a composite material allow both of bending forming and curing of the prepreg P in a same pressure vessel. Conventionally, a process of warming to a predetermined temperature to shape a laminated body of the sheet-like prepregs P, using specialized bending forming equipment and a process of performing heating and curing of the shaped prepreg P under pressurization by autoclave processing needed to be performed individually. By contrast, the molding equipment 1 of a composite material and the molding method of a composite material allow bending forming, and heating and curing under pressurization of the prepreg P by one process. As a result, the number of processes decreases and a molded product of a composite material having a complicated structure, such as a bent shape or a curved shape, can be manufactured more simply.

In particular, when steam is used as the heating medium H, a temperature distribution of the heating medium H can be made more uniform, compared to the case where warm air or heated nitrogen is used as the heating medium H. In addition, a pressure distribution applied on the prepreg P by the heating medium H can also be made more uniform.

Therefore, even in the case of a molding target having a large size, each part can be heated up to a predetermined temperature at equivalent timing. Furthermore, a heating period of each part can also be equalized. Thereby, poor appearance and deterioration in internal quality due to local curing, local poor curing or the like can be avoided. As a result, even a molded product of a composite material whose length in the longitudinal direction is not less than 1 m and not more than 100 m can be manufactured in satisfactory quality by heating and curing with bending forming.

When steam is used as the heating medium H, the temperature of the heating medium H can be instantly increased. Furthermore, amount of heat, which steam can give to a heating target, reaches about three to five times as much as that of warm air. Therefore, a time required for a temperature rise of the prepreg P can also be shortened. This leads to shortening of a time required for bending forming of the prepreg P and a time required for curing of the prepreg P. Therefore, manufacturing costs can be reduced and productivity can be improved by a shortening molding lead time of a molded product.

Furthermore, when steam is used as the heating medium H, a circulating structure of the heating medium H becomes unnecessary. Therefore, a structure of the molding equipment 1 can be simplified. Furthermore, since steam does not burn, safety can be secured.

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A molding equipment of a composite material comprising:
   a vessel that houses a molding target sealed by a sealing object;
   a decompression system that:
      decompresses a region surrounded by the sealing object to a first pressure appropriate for bending forming of the molding target; and
      decompresses the region surrounded by the sealing object to a second pressure appropriate for heating and curing of the molding target; and a heating medium supply system that:
  as the region surrounding the sealing object is decompressed to the first pressure, supplies a heating medium at a first temperature appropriate for the bending forming of the molding target into the vessel; and
  as the region surrounding the sealing object is decompressed to the second pressure, supplies the heating medium at a second temperature appropriate for the heating and curing of the molding target into the vessel.

2. The molding equipment of the composite material according to claim 1,
  wherein the heating medium supply system is configured to supply steam as the heating medium.

3. The molding equipment of the composite material according to claim 1,
  wherein the decompression system includes variable vacuum equipment that decompresses the region, surrounded by the sealing object, to the first pressure appropriate for the bending forming of the molding target and subsequently decompresses the region, surrounded by the sealing object, to the second pressure appropriate for the heating and the curing of the molding target.

4. The molding equipment of the composite material according to claim 1, further comprising:
  a vacuum control circuit configured to control the decompression system to make the region surrounded by the sealing object be decompressed to the first pressure appropriate for the bending forming of the molding target and subsequently to the second pressure appropriate for the heating and the curing of the molding target.

5. The molding equipment of the composite material according to claim 1, further comprising:
  a temperature control circuit configured to set a control value of a temperature of the heating medium to a value appropriate for the bending forming of the molding target and subsequently to a value appropriate for the heating and the curing of the molding target.

6. The molding equipment of the composite material according to claim 2,
  wherein the heating medium supply system is configured to supply saturated steam, steam in which air is mixed, or steam in which nitrogen is mixed, as the heating medium.

7. The molding equipment of the composite material according to claim 1,
  wherein the first pressure appropriate for bending forming of the molding target is different than the second pressure appropriate for heating and curing of the molding target.

8. A molding method of a composite material for manufacturing a molded product of the composite material using the molding equipment of the composite material according to claim 1.

9. A molding method of a composite material comprising:
  carrying a molding target into a vessel, the molding target being sealed by a sealing object;
  heating the molding target by supplying a heating medium into the vessel at a first temperature, and performing bending forming of the molding target by decompressing a region surrounded by the sealing object in the vessel to a first pressure appropriate for bending forming of the molding target; and
  heating and curing the molding target after the bending forming, the molding target being heated and cured while decompressing the region surrounded by the sealing object to a second pressure appropriate for heating and curing of the molding target, the molding target being heated and cured by supplying the heating medium into the vessel at a second temperature.

10. The molding method of the composite material according to claim 8,
  wherein the region surrounded by the sealing object is decompressed to different pressures in incremental steps.

11. The molding method of the composite material according to claim 8,
  wherein a pressure in the region surrounded by the sealing object is changed continuously by decompression of the region surrounded by the sealing object.

12. The molding method of the composite material according to claim 9,
  wherein at least one of pressurization for the bending forming of the molding target and pressurization for curing of the molding target after the bending forming is performed by controlling a pressure of the heating medium in the vessel.

13. The molding method of the composite material according to claim 8,
  wherein a molded product of the composite material of which a length in a longitudinal direction is not less than 1 m and not more than 100 m is manufactured.

14. The molding equipment of the composite material according to claim 2,
  wherein the decompression system includes variable vacuum equipment that decompresses the region, surrounded by the sealing object, to the first pressure appropriate for the bending forming of the molding target and subsequently decompresses the region, surrounded by the sealing object, to the second pressure appropriate for the heating and the curing of the molding target.

15. The molding equipment of the composite material according to claim 2, further comprising:
  a vacuum control circuit configured to control the decompression system to make the region surrounded by the sealing object be decompressed to the first pressure appropriate for the bending forming of the molding target and subsequently to the second pressure appropriate for the heating and the curing of the molding target.

16. The molding equipment of the composite material according to claim 2, further comprising:
  a temperature control circuit configured to set a control value of a temperature of the heating medium to a value appropriate for the bending forming of the molding target and subsequently to a value appropriate for the heating and the curing of the molding target.

17. The molding equipment of the composite material according to claim 3,
  wherein the variable vacuum equipment includes:
    decompression subsystems that decompresses the region, surrounded by the sealing object, to different pressures respectively; and
    a switching structure that switches the decompression subsystems.

18. The molding method of the composite material according to claim 9,
wherein the region surrounded by the sealing object is decompressed to different pressures in incremental steps.

19. The molding method of the composite material according to claim 9,
wherein a pressure in the region surrounded by the sealing object is changed continuously by decompression of the region surrounded by the sealing object.

20. The molding method of the composite material according to claim 9,
wherein a molded product of the composite material of which a length in a longitudinal direction is not less than 1 m and not more than 100 m is manufactured.

* * * * *